COMMUNICATIONS REPEATER SYSTEM

Filed July 8, 1963 3 Sheets-Sheet 1

DONALD L. MARGERUM,
ANDREW L. PERGA,
INVENTORS.

BY THEIR ATTORNEYS.
Spensley & Horn

DONALD L. MARGERUM,
ANDREW L. PERGA,
INVENTORS

BY THEIR ATTORNEYS.
Spensley & Horn

INVENTORS.
DONALD L. MARGERUM,
ANDREW L. PERGA,
BY THEIR ATTORNEYS
Spensley & Horn.

3,300,782

COMMUNICATIONS REPEATER SYSTEM

Donald L. Margerum, Woodland Hills, and Andrew L. Perga, Flintridge, Calif., assignors to Electronic Specialty Co., Los Angeles, Calif., a corporation of California Filed July 8, 1963, Ser. No. 293,499
8 Claims. (Cl. 343—100)

This invention relates to the retransmission and focusing of radio frequency energy, and more particularly to a novel system of retrodirective antenna modules forming a coherently focused array suitable for use as a communications repeater.

The term "antenna module," as utilized herein, refers to an RF unit including transmitting and receiving means coupled to an antenna.

The use of microwave frequencies for long-distance communication has become increasingly important of late, particularly because of the need for a great number of new communications channels. Due to the line-of-sight transmission characteristics of microwave energy, it has been found necessary to use a series of repeater stations for the transmission of microwave signals over great distances, such as across a continent. However, with the recent development of space satellites there arises the practical possibility of positioning a communications repeater in space to thereby allow formation of a transcontinental, and even an intercontinental, microwave communications system needing only a single repeater station. The practicality of such a concept has been demonstrated by the recent successful intercontinental transmission of television signals. For maximum efficiency, the energy radiated by such a satellite repeater should be focused on the receiving station on earth regardless of the attitude of the satellite. Also, to allow two-way communication, the satellite repeater should be capable of bistatic operation to simultaneously redirect signals being received from two different directions, the energy radiated by the repeater being coherently focused in the two directions. The present invention is directed toward a communications repeater having these aforementioned desirable characteristics.

The present invention is based on retrodirective circuits for receiving radio-frequency signal waves on one frequency and transmitting radio-frequency energy on a different frequency, the radiated RF energy being maintained in phase conjugate relationship with the received signals. A bistatic antenna module can be formed of two such retrodirective circuits, each of the circuits transmitting and receiving on different frequencies from the other, suitable control circuitry transferring modulation information received by one circuit to the beam radiated by the other circuit, and vice versa. A plurality of identical such antenna modules can thus be formed into an array coherently focused on the sources of received signals on both of the receiving frequencies. Such an array provides the desired repeater function in transferring intelligence between two dispersed remote stations by receiving intelligence imposed by frequency or phase modulation of a carrier radiated on one frequency by the first remote station and retransmitting it on another frequency, the retransmitted energy being focused on the second remote station. Since each of the remote stations transmits on different frequencies and receives on still different frequencies, two-way communication is possible, only one of the two transmitting signals being modulated at a time.

In accordance with the present invention concepts, the basic retrodirective circuit includes an antenna coupling device, IF signal generating means, modulator means and phasing control means. The antenna coupling device has a signal receiving terminal and a transmitting signal terminal, the device functioning to selectively direct signals received by the antenna to the signal receiving terminal and to selectively direct to the antenna RF signals applied to its transmitting signal terminal. The IF signal generating means generates signals of a predetermined intermediate frequency, the phasing of signals generated by the IF signal generating means being variable in response to changes in an applied electrical control signal. The signal generated by the IF signal generating means is applied to the modulator means which combines this signal with an RF reference signal to thereby produce upper and lower sideband outputs. The upper sideband output of the modulator means is coupled to the transmitting signal terminal of the antenna coupling device for radiation by the antenna. The lower sideband output of the modulator means is coupled to an input of the phasing control means along with the received signal, the phasing control means providing an output voltage which varies in accordance with differences in phase between the received signal and the lower sideband output of the modulator means, the output of the phasing control means providing the electrical control voltage for the IF signal generating means to maintain the phase of the signal produced by the IF signal generating means in conjugate relationship with the phase of received signals, thereby maintaining the signals radiated by the antenna in phase conjugate relationship with received signals. Although the phasing control means can be a simple RF phase detector, it is presently preferred to utilize the superheterodyne principle. Thus, in the presently preferred embodiment of the present invention apparatus, the phasing control means comprises the combination of a frequency converter and an IF phase detector means, the frequency converter heterodyning the lower sideband output of the modulator means with received signals to produce a first IF signal, which is fed to one input of the phase detector. A second IF signal of the predetermined intermediate frequency and of zero reference phase is fed to the other input of the phase detector, the phase detector comparing the first and the second IF signals to produce an output voltage which varies in accordance with differences in phase between the first and second IF signals. The output voltage of the phase detector is coupled to the IF signal generating means to provide the electrical control signal therefor.

Accordingly, it is an object of the present invention to provide an improved antenna module of the type including an antenna coupled to means for transmitting and receiving radio frequency energy, the transmitting frequency being different from the receiving frequency.

It is also an object of the present invention to provide an improved antenna module of the aforementioned type for monostatic operation in which received signals are coherently translated in frequency and reradiated, the reradiated signals being maintained in phase conjugate relationship with the received signals.

It is another object of the present invention to provide an improved retrodirective antenna array comprising a plurality of antenna modules of the above characteristics.

It is a further object of the present invention to provide an improved retrodirective antenna array comprising a plurality of antenna modules of the above characteristics, the array being capable of bistatic operation.

It is an additional object of the present invention to provide an improved communications repeater.

It is yet another object of the present invention to provide an improved communications repeater comprising an array of antenna modules of the above characteristics.

It is a still further object of the present invention to provide an improved communications repeater in which received radio frequency signals are coherently translated in frequency before retransmission.

It is also an object of the present invention to provide an improved communications repeater in which RF energy radiated by the repeater is coherently focused on the source of a received RF signal.

It is another object of the present invention to provide an improved communications repeater for two-way communications.

It is a further object of the present invention to provide a two-way communications repeater in which the RF energy radiated by the repeater intended for reception by a first remote station is maintained in phase conjugate relationship with the RF signals received from the first station, and in which the RF energy radiated by the repeater intended for reception by a second remote station is maintained in phase conjugate relationship with the RF signals received from the second station.

It is a still further object of the present invention to provide an improved two-way communications repeater system in which the RF signals received from the two remote communications stations are coherently translated in frequency by the repeater and reradiated, the RF energy radiated by the repeater intended for reception by the first station being maintained in phase conjugate relationship with the signals received from the first station, the RF energy radiated by the repeater intended for reception by the second station being maintained in phase conjugate relationship with the signals received from the second station.

The novel features which are believed to be characteristic of the invention, both as to its organization and method of operation, together with further objects and advantages thereof will be better understood from the following description, considered in connection with the accompanying drawing, in which a presently preferred embodiment of the invention is illustrated by way of example. It is to be expressly understood, however, that the drawing is for the purpose of illustration and description only, and is not intended as a definition of the limits of the invention.

In the drawing:

FIGURE 5 is a schematic diagram, in block form, showing a retrodirective array using a plurality of the bistatic antenna modules of FIGURE 4.

Figure 1:
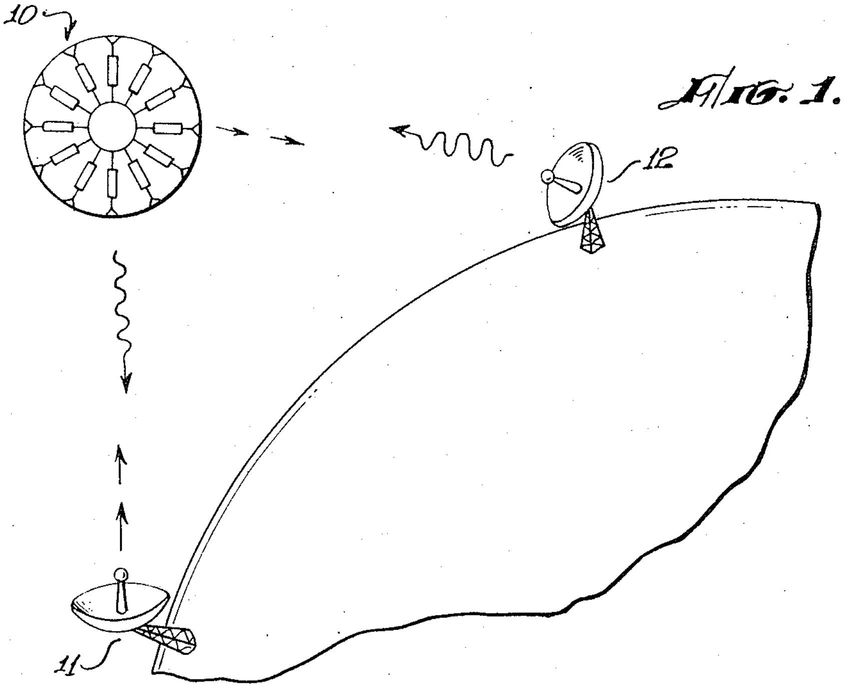
FIGURE 1 is a pictorial view of a microwave communications system utilizing a two-way repeater positioned in a satellite.

Turning now to the drawing, in FIGURE 1 there is shown a pictorial view of a long-distance microwave communications system using a single repeater unit disposed in a satellite, the satellite being generally indicated by the reference numeral 10. Two communications stations 11 and 12 are positioned at widely spaced apart points on the surface of the earth. The pictorial representation of FIGURE 1 shows signals transmitted by the station 11 being received by the satellite 10 and relayed to the station 12, the satellite also relaying signals from the station 12 to the station 11. Such operation is readily achieved by maintaining the signals transmitted by the station 11 at a different frequency from the signals radiated by the station 12. To provide an efficient communications system of this type, the RF energy radiated by the satellite should be focused on the two remote stations, thereby providing greater effective utilization of available RF power, together with the subsidiary advantages of a reduction in the size and weight of the transmitting equipment needed to establish a given signal level at the remote receivers.

To ensure proper focusing of the RF energy radiated by the satellite regardless of the attitude of the satellite with respect to the earth, the present invention utilizes the so-called coherent focusing principle. The coherent focusing principle refers to the maintenance of a phase conjugate relationship between the RF energy radiated by individual antennas in an array of antennas and signals received by the array. A signal wave front approaching a dispersed array of antennas from an angle will impinge on the nearer antennas in the array before it impinges on the farther antennas, thereby giving rise to a relative phase difference in the signal as it appears to the different antennas in the array. More specifically, if a radio frequency signal of a frequency $f$ and zero phase (indicated by the reference notation $f\angle 0$) is radiated from a target point a distance $R_i$ from the ith antenna in an array, the signal will be received by the ith as $F\angle -kR_i$, where $k=2\pi f/c$, $c$ being the free space velocity of the radiation. It thus becomes apparent that if it is desired to radiate a signal from the array to the target point and each antenna in the array simultaneously emits an identical signal, the total energy radiated by the array will not be focused on the target point because the identically radiated signals will not all be in phase as they arrive at the target point. However, if each antenna in the array transmits the phase conjugate of its received signal, $f\angle +kR_i$ for the ith antenna for example, the signal radiated by each antenna will arrive at the target point as $f\angle 0$. Thus, the radiated waves combine in phase to focus radiation on the target point, i.e., the radiated waves are coherently focused on the target point.

The coherent focusing principle is applicable in the present invention system since the satellite 10 is both transmitting to and receiving from each of the two stations 11 and 12, albeit the transmissions and and receptions are on different frequencies. Therefore the repeater unit in the satellite must be capable of coherent frequency translation, as well as coherent focusing. Hence, an initial step in the development of such a repeater unit was to device an antenna module capable of translating frequency coherently while maintaining a phase conjugate relationship between transmitted and received signals.

Figure 2:
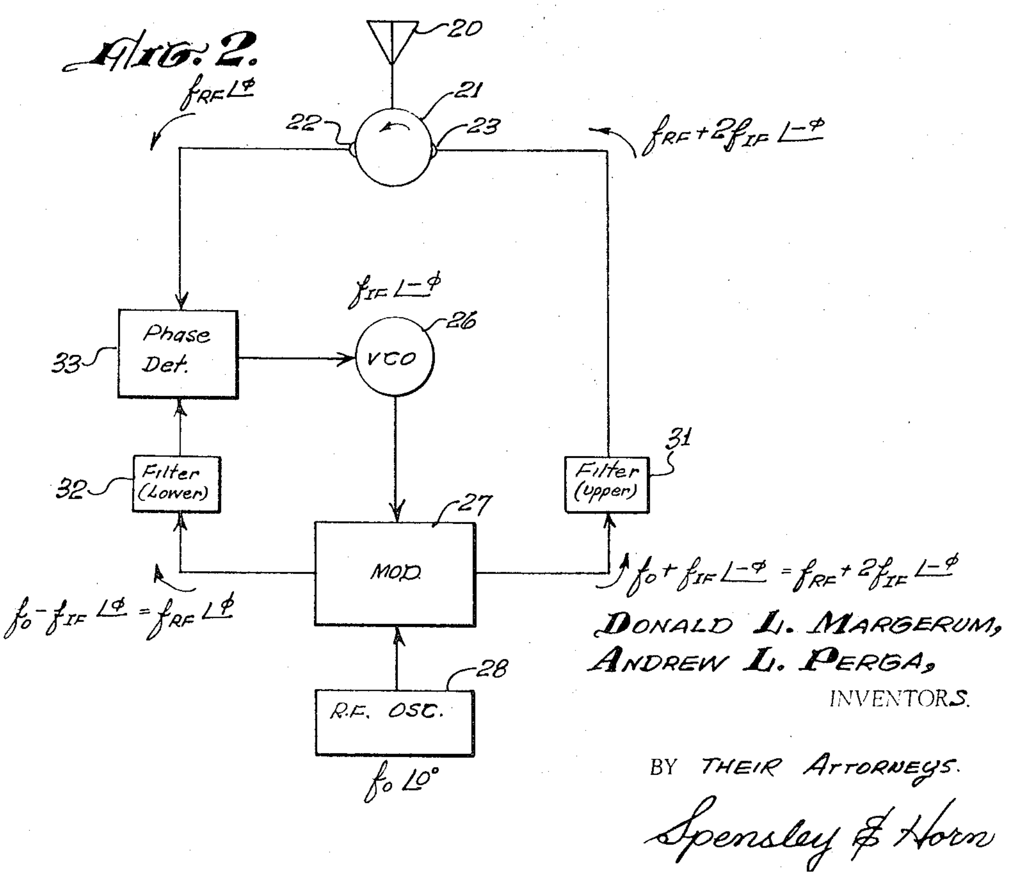
FIGURE 2 is a schematic diagram, in block form, showing a first embodiment of a monostatic antenna module.

In FIGURE 2 of the drawings, there is shown a schematic diagram of an antenna module which functions to coherently translate frequency while maintaining a phase conjugate relationship between transmitted and received signals. An antenna 20 is provided for the radiation and interception of radio waves, the antenna being connected to a directionally sensitive microwave coupling device, such as a circulator 21. A "circulator" is a nonreciprocal ferrite device of the so-called "magic T" type, a high degree of isolation being maintained between its transmitting and receiving ports. A circulator is presently preferred for use as the antenna coupling device since it does not require time sharing as do other types of duplexers, such as the T–R switch, for example. The receiving port of the circulator 21 is identified by the reference numeral 22, and the transmitting port by the reference numeral 23. The various other electrical components indicated in the diagram of FIGURE 2, such as phase detectors, filters, modulators, etc., are well-known in the art and hence will not be discussed in detail. Upon explanation of their various functions, suitable types of individual components will become apparent to those skilled in the art.

To aid in the explanation of the operation of the circuitry, various portions of the circuitry are labeled to indicate the signals passing therethrough under exemplary operating conditions. Far example, it is assumed that the signal received by the antenna 20 and presented at the receiving port 22 of the circulator is of a frequency $f_{RF}$ and a phase $\phi$, as indicated by the vector notation $f_{RF}\angle\phi$. The signal supplied to the transmitting port 23 of the circulator for radiation by the antenna 20 is indicated by the vector notation $(f_{RF}+2f_{IF})\angle-\phi$, indicating a frequency translation of $2f_{IF}$ and a reversal of phase.

The intermediate frequency $f_{IF}$ is generated within the antenna module by a voltage-controlled oscillator 26. The output of the oscillator 26 is fed to one input of a modulator 27, the modulator 27 preferably being of the double sideband suppressed carrier type. RF energy is generated by an RF oscillator 28, the output of this oscillator being of zero phase and at a frequency $f_0$. The frequency $f_0$ is higher than the frequency of the received signal, $f_{RF}$, by an amount equal to the intermediate frequency, $f_{IF}$. In other words, $f_0-f_{IF}=f_{RF}$. For example, when receiving 10,000 megacycle signals and utilizing an IF frequency of 30 megacycles, the RF oscillator 28 is adjusted to operate on a frequency of 10,030 megacycles.

The combination of the outputs of the oscillators 26 and 28 in the modulator 27 results in upper and lower sideband outputs from the modulator. The upper sideband is $(f_0+f_{IF})\angle-\phi$, which is equal to $$(f_{RF}+2f_{IF})\angle-\phi$$

The lower sideband is $(f_0-f_{IF})\angle\phi$, which is equal to $f_{RF}\angle\phi$.

The upper sideband output of the modulator 27 is fed to the transmitting port 23 of the circulator through an upper sideband filter 31, the filter 31 typically being a high-pass filter having a cutoff frequency slightly below the upper sideband frequency so that the upper sideband will be passed, and lower sideband energy and RF energy of the frequency $f_0$ will be suppressed. The lower sideband output of the modulator 27 is fed to one input of an RF phase detector 33 through a lower sideband filter 32, the filter typically being of the low-pass type having a cutoff frequency slightly above the lower sideband frequency to pass energy of the lower sideband frequency and of the frequency $f_0$. The received signals appearing at the receiving port 22 of the circulator are fed to the other input of the phase detector 33. The output of the phase detector 33 is coupled to the voltage-controlled oscillator 26 to provide the control voltage therefor.

In operation, it is desired to maintain the outputs of the oscillators 26 and 28 at a fixed phase differential in accordance with the phase of the received signals. For example, in the illustrated embodiment of FIGURE 2 wherein the received signals are assumed to be at an angle $\phi$, it is desired to maintain the output of the voltage-controlled oscillator 26 at a phase $-\phi$, the output of the RF oscillator 28 being chosen as a zero reference for ease of explanation. Assume for a moment that the voltage-controlled oscillator 26 is properly phased and produces the desired output $f_{IF}\angle-\phi$. In this case, the lower sideband output of the modulator 27 will be exactly equal to $f_{RF}\angle\phi$. Since the identical signal $f_{RF}\angle\phi$ is being applied to both inputs of the phase detector 33, the phase detector will produce no output and hence the voltage-controlled oscillator 26 is allowed to continue to run as is. However, should the output of the voltage-controlled oscillator 26 begin to drift, or should the phase of the received signals change, the two inputs to the phase detector 33 will no longer be identical and hence a control voltage output will be produced by the phase detector and applied to the voltage-controlled oscillator 26 to alter the phasing of that oscillator in the proper direction to bring the oscillator back into the desired phase relationship. Thus, the circuit of FIGURE 2 operates generally as a closed loop servo system driven to a null balance, the servo loop encompassing the lower sideband signal output of the modulator.

The upper sideband output of the modulator 27 is radiated by the antenna 20 and is maintained in phase conjugate relationship with the received signal, although translated in frequency by an amount $2f_{IF}$. It is therefore seen that whereas the incoming signals are at a phase $\phi$, the outgoing signals are at a phase $-\phi$, the condition required for retrodirectivity. In addition, a frequency offset of $2f_{IF}$ is provided.

The circuit of FIGURE 2 utilizes an RF phase detector, such as a frequency discriminator using a hybrid coil in conjunction with crystal video detectors, for example, and is characterized by a rather low sensitivity resulting from the noise generated in the crystal video detectors at microwave frequencies. In an effort to provide a more sensitive antenna module circuit characterized by coherent focusing and frequency translation, the circuit of FIGURE 3 was developed. The circuit of FIGURE 3 utilizes the superheterodyne principle to permit phase detection at frequencies much lower than microwave frequencies. For example, whereas phase detection in the circuit of FIGURE 2 occurs at the RF frequency on the order of 10,000 megacycles, phase detection in the circuit of FIGURE 3 occurs at a much lower intermediate frequency, such as on the order of 30 megacycles, for example.

Figures 3, 4:
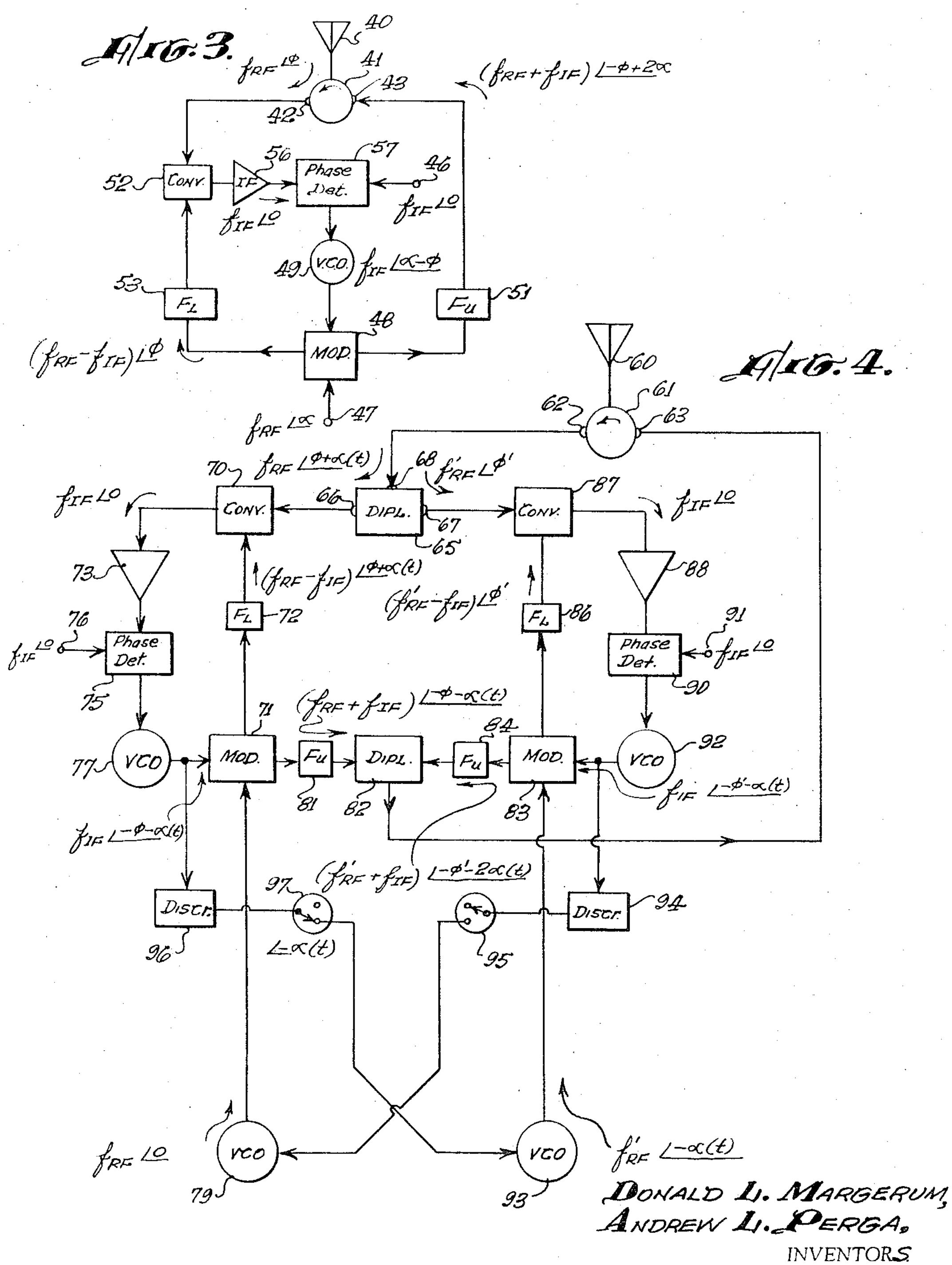
FIGURE 3 is a schematic diagram, in block form, showing a second embodiment of a monostatic antenna module.
FIGURE 4 is a schematic diagram, in block form, showing a bistatic antenna module using a plurality of the monostatic antenna modules of FIGURE 3, the array providing bistatic operation.
Figure 3:
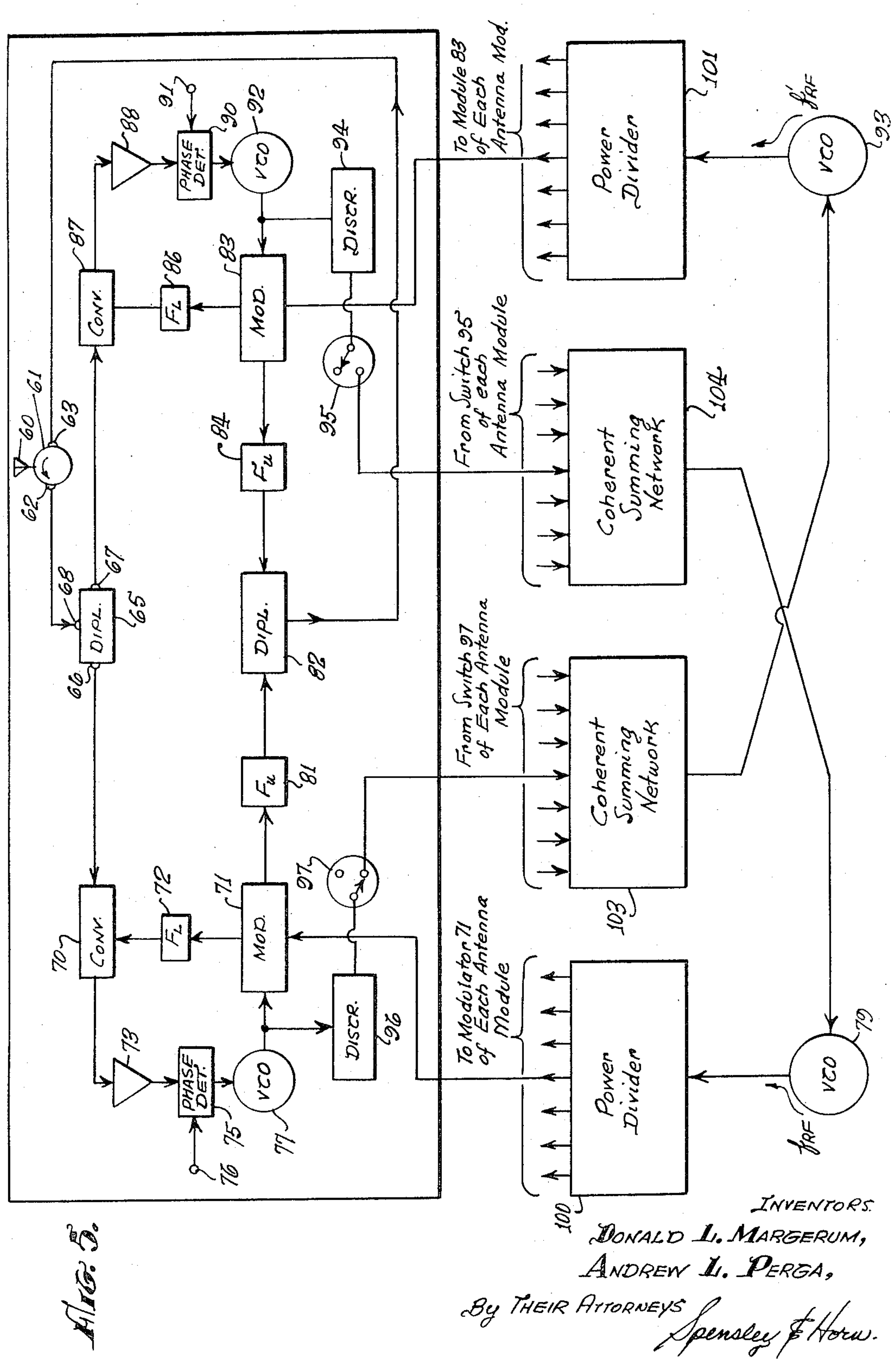

Referring specifically to the schematic diagram of FIGURE 3, an antenna 40 is provided for the radiation and interception of microwave signals, the antenna being connected to a circulator 41. The receiving and transmitting ports of the circulator 41 are respectively identified by the reference numerals 42 and 43. Again, to aid in the explanation of the operation of the circuitry, various portions of the circuit are labeled to indicate the signals passing therethrough under the exemplary operating conditions assumed in the discussion of the operation of the circuit of FIGURE 2. Thus, the signal received by the antenna 40 and presented at the receiving port 42 of the circulator 41 is indicated by the vector notation $f_{RF}\angle\phi$, the signal $(f_{RF}+f_{IF})\angle-\phi+2\alpha$, being supplied to the transmitting port 43 of the circulator for radiation by the antenna 40.

Two reference signals are supplied to the module, one of the reference signals being at an intermediate frequency and the other reference signal being at the microwave reception frequency. The IF reference signal is applied to an input terminal 46, this signal being indicated by the vector notation $f_{IF}\angle 0$. The RF reference signal is applied to an input terminal 47, this signal being indicated by the vector notation $f_{RF}\angle\alpha$. The angle $\alpha$ is arbitrarily chosen with respect to the IF signal used as the zero reference, the angle $\alpha$ being here indicated to make it clear that the RF reference signal need not be phase locked with the IF reference signal.

The RF input terminal 47 is coupled to one input of a modulator 48, preferably of the double sideband suppressed carrier type. The other input to the modulator 48 is coupled to the output of a voltage-controlled oscillator 49 adjusted for operation at the IF frequency to produce a signal $f_{IF}\angle\alpha-\phi$. The combination of the signals $f_{RF}\angle\alpha$ and $f_{IF}\angle\alpha-\phi$ in the modulator 48 results in upper and lower sideband outputs from the modulator, the upper sideband being $(f_{RF}+f_{IF})\angle-\phi+2\alpha$ and the lower sideband being $(f_{RF}-f_{IF})\angle\phi$. The upper sideband output of the modulator 48 is fed to the transmitting port 43 of the circulator through a high-pass filter having its cutoff frequency slightly lower than the upper sideband frequency. The lower sideband output of the modulator 48 is fed to one input of a frequency converter 52 through a low-pass filter 53, the cutoff frequency of which is slightly above the lower sideband frequency.

The received signal $f_{RF}\angle\phi$ appears at the receive-port 42 of the circulator and is fed to the other input of the frequency converter 52. The output of the frequency converter 52, resulting from the combination of the signals fed to its two inputs, is at the intermediate frequency $f_{IF}$ and, under the illustrated exemplary operating conditions, is of zero phase. The IF output of the frequency converter 52 is fed through an IF amplifier 56 to one input of a phase detector 57, the IF signal terminal 46 is coupled to the other input of the phase detector 57 for application thereto of the IF reference signal.

In operation, the lower sideband output of the modulator 48 is heterodyned with the received signal to produce an IF signal output which is compared in the phase detector 57 with the IF reference signal applied to the terminal 46. The output of the phase detector 57 provides the control voltage for the voltage-controlled oscillator 49. For proper operation, it is desired to maintain the output of the voltage-controlled oscillator 49 at a phase $\alpha-\phi$. Under the exemplary operating conditions illustrated in FIGURE 3, the phase detector 57 produces no output voltage since identical signals are being presented to its two inputs. However, should the phasing of the received signal or of the output of the oscillator 49 change, then the IF signal output of the frequency converter 52, produced by heterodyning the modulator lower sideband output with the received signal, will no longer correspond to the applied IF reference signal. Under these conditions, the two inputs to the phase detector 57 will no longer be equal and the phase detector will provide an output voltage which is applied to the voltage-controlled oscillator 49 in the form of a control voltage to alter the phasing of this oscillator in the proper direction to quickly bring the radiated signal back into phase conjugate relationship with the received signal, the phasing of the received signal being $\phi$ and that of the radiated signal being $-\phi+2\alpha$. Now if the angle $\alpha$ is varied with time in a certain manner so as to impose intelligence on the RF reference signal fed to the input terminal 47, such as by frequency or phase modulation, the intelligence will be imposed on the radiated signal with a deviation of twice the phase shift impressed on the RF reference signal. Thus, it is seen that the module of FIGURE 3 is capable of coherently focusing a modulated signal upon the source of a received RF carrier.

In comparing the circuits of FIGURES 2 and 3, it is seen that the RF phase detector 33 comprises the phasing control means of FIGURE 2, whereas the phasing control means in the circuit of FIGURE 3 comprises the frequency converter 52, the IF amplifier 56 and the IF phase detector 57 (in conjunction with the IF reference signal applied to the terminal 46). It is seen that phase detection in the circuitry of FIGURE 3 occurs at the IF frequency, typically on the order of 30 megacycles, rather than at the microwave reception frequency. Among the advantages in the use of an IF detector are increased sensitivity, simpler and less expensive circuitry, and relatively better stability.

Since only the upper sideband output of the modulator is to be radiated by the antenna, it is presently preferred to use a particular type of modulator known in the art as a "parametric up-converter." Parametric up-converters are modulators for use at microwave frequencies, these modulators being characterized by a suppression of their lower sideband outputs. Parametric up-converters typically employed "Varactor" crystal diodes and resonant line filters. The RF carrier fed to a parametric up-converter is commonly referred to as the "pump frequency," and the modulation commonly referred to as the "signal frequency." The use of a parametric up-converter in the modulator of the present invention circuitry results in high efficiency since most of the output power of the modulator is channeled to its upper sideband output. The voltage-controlled oscillator 26, which operates at an IF frequency typically on the order of 30 megacycles, can be a simple transistor oscillator. The great ratio between the IF and RF frequencies enables the use of a very high gain up-converter.

A dispersed array of antennas may be formed by utilizing a plurality of the antenna modules of FIGURE 3, each of the modules being fed identical reference signals $f_{IF}\angle 0$ and $f_{RF}\angle\alpha$. The antenna modules forming such an array could be employed on a satellite repeater by positioning the modules at random, with a uniform distribution, over the surface of a sphere. Such a satellite repeater will provide only monostatic operation, hence the satellite repeater must be maintained in a spin stabilized attitude at a sufficient distance from the transmitting and receiving stations so that both of the stations will be within the primary lobe of the free-space radiation pattern of the array. Use of a parametric up-converter as the modulator results in conversion of most of the input RF power from the pump oscillator to transmitted power $(f_{RF}+f_{IF})$, with a possible theoretical efficiency of about fifty (50%) percent. By utilizing sensitivity thresholds to activate the voltage-controlled oscillators in each of the antenna modules in the array, only those antennas in the array which are receiving energy can be selectively used, thereby drawing power from the pump oscillator for only the appropriate modules.

Whereas the antenna module circuits of FIGURES 2 and 3 provide retrodirectivity, the use of two such retrodirective circuits with provisions for transferring modulation information from one beam to the other will allow bistatic operation of such modules. Thus, a bistatic antenna module can be formed by the proper intercoupling of two of the monostatic modules of FIGURE 3, such a bistatic antenna module being diagrammed in FIGURE 4 of the drawing.

In the circuit of FIGURE 4, an antenna 60 is coupled to a circulator 61, the circulator being provided with a receiving port 6 and a transmitting port 63. Radio frequency signals received by the antenna 60 appear at the receiving port 62 of the circulator 61 and are fed to a frequency-sensitive microwave coupling device, such as a diplexer 65. A "diplexer" is a reciprocal coupling device for the simultaneous, selective coupling of RF energy of different frequencies. Thus, unlike the T–R switch and other types of duplexers which share time, the diplexer shares frequency. A diplexer is provided with a common terminal and two signal terminals, each signal terminal being coupled to the common terminal by frequency-selective filtering means. The frequency-selective filtering means functions to efficiently couple RF signals of one frequency range between the common terminal and one of the signal terminals, and RF signals of a different frequency range between the common terminal and the other signal terminal without any significant interaction between the two signal terminals. Although input signals are usually fed into the common terminal of a diplexer for separation according to frequency and presentaton at the appropriate signal terminals, the input signals can be fed into the proper signal terminals of a diplexer for combination at the common terminal since a diplexer is a matched, reciprocal device. This latter mode of operation is also utilized in the present invention apparatus, as will be explained hereinbelow.

The diplexer 65 is provided with signal terminals 66 and 67, and a common terminal 68. The common terminal 68 is coupled to the receiving port 62 of the circulator 61. The diplexer signal terminal 66 is coupled to one input of a frequency converter 70, the other input of the frequency converter 70 being coupled to the lower sideband outputs of a double sideband modulator 71 by means of a low-pass filter 72. The output of the frequency converter 70 is coupled through an amplifier 73 to one input of a phase detector 75. The other input to the phase detector 75 is an intermediate frequency reference signal which is applied to an IF input terminal 76. The output of the phase detector 75 provides the control voltage for a voltage-controlled oscillator 77. The output of the voltage-controlled oscillator 77 is coupled to one input of the modulator 71, the other input to the modulator 71 being provided by the output of an RF voltage-controlled oscillator 79.

The upper sideband output of the double sideband modulator 71 is fed through a high-pass filter 81 to one signal terminal of a diplexer 82. The upper sideband output of a double sideband modulator 83 is fed to the other signal terminal of the diplexer 82 through a high-pass filter 84. Thus, the diplexer 82 functions to combine at its common terminal signals fed to its two signal terminals. The lower sideband output of the modulator 83 is fed through a low-pass filter 86 to one input of a frequency converter 87, the other input to the frequency converter 87 being coupled to the signal terminal 67 of the diplexer 65. The output of the frequency converter 87 is fed through an amplifier 88 to one input of a phase detector 90, the other input of the phase detector 90 being an intermediate frequency reference signal fed to an IF input terminal 91. The output of the phase detector 90 provides the control voltage for a voltage-controlled oscillator 92, the output of the voltage-controlled oscillator 92 being one of the inputs to the double sideband modulator 83. The other input to the double sideband modulator 83 is an RF reference signal provided from an RF voltage-controlled oscillator 93.

The output of the voltage-controlled oscillator 92 also provides the control voltage for the RF reference voltage-controlled oscillator 79, the output of the voltage-controlled oscillator 92 being applied to the oscillator 79 through a phase discriminator 94 and a switch 95. The output of the voltage-controlled oscillator 77 provides the control voltage for the RF reference voltage-controlled oscillator 93, the output of the oscillator 77 being coupled to the oscillator 93 through a phase discriminator 96 and a switch 97.

The signal transmitted by the antenna 60 is the common terminal output of the diplexer 82 which is fed to the transmitting port 63 of the circulator 61 for radiation by the antenna.

Operation of the antenna module of FIGURE 4 will now be discussed, assuming that the module is positioned in the space satellite 10 of FIGURE 1 and is functioning to relay intelligence from the ground station 11 to the ground station 12 under the following exemplary operating conditions. The RF carrier transmitted by the ground station 11 is of a frequency $f_{RF}$ and arrives at the antenna 60, under conditions of no modulation, as a signal indicated by the vector notation $f_{RF}\angle\phi$. The RF carrier transmitted by the ground station 12 is of a frequency $f'_{RF}$ and arrives at the antenna 60 as a signal $f'_{RF}\angle\phi'$. The voltage-controlled oscillator 77 is adjusted for operation at an intermediate frequency $f_{IF}$ in accordance with the phase conjugate of the carrier received from the ground station 11, i.e., $f_{IF}\angle-\phi$. Similarly, the voltage-controlled oscillator 92 is adjusted for operation at the intermediate frequency $f_{IF}$ in accordance with the phase conjugate of the RF carrier received from the ground station 12, i.e., $f_{IF}\angle-\phi'$. An intermediate frequency reference signal of zero phase, $f_{IF}\angle 0$, is applied to the IF input terminals 76 and 91. The voltage-controlled oscillator 79 is adjusted for normal operation at the frequency $f_{RF}$ and zero reference phase, i.e., $f_{RF}\angle 0$. The voltage-controlled oscillator 93 is adjusted for normal operation at the RF frequency $f'_{RF}$ and at zero reference phase, i.e., $f'_{RF}\angle 0$. (The voltage-controlled oscillators 79 and 93 are specified as adjusted to zero phase merely for ease of explanation, the phasing of these oscillators being arbitrary, as indicated hereinabove.) Under these conditions, with no modulation of either of the carriers from the ground stations 11 and 12, the signal radiated from the antenna 60 back toward the ground station 11 will be $(f_{RF}+f_{IF}\angle-\phi$, which is the desired phase conjugate of the received signal. Similarly, the signal radiated by the antenna 60 back toward the ground station 12 will be in the desired phase conjugate relationship, this signal being indicated by the vector notation $(f'_{RF}+f_{IF})\angle-\phi'$. The operation of the antenna module of FIGURE 4, under conditions of no modulation, is in accordance with the explanation of the basic circuit of FIGURE 3, FIGURE 4 being a combination of two such circuits operating on different frequencies, the two circuits being intercoupled by appropriate diplexers. The diplexer 65 feeds signals of the frequency $f_{RF}$ to the left-hand portion of the circuitry and signals of the frequency $f'_{RF}$ to the right-hand portion of the circuitry. For purposes of further reference, the left-hand portion of the circuitry may be called the "unprimed" circuitry and the right-hand portion called the "primed" circuitry, the terms "primed" and "unprimed" referring to the identification of the signals handled by these circuits in the exemplary embodiment. The upper sideband output of the modulator 71 is fed to the antenna 60 through the diplexer 82, the upper sideband output of the modulator 83 being similarly fed through the diplexer 82 for radiation by the antenna 60.

Referring now to the various vector notations on the diagram of FIGURE 4, assume that the RF carrier from the ground station 11 is phase modulated with intelligence which appears to the antenna 60 to be at the angle $\alpha$ which varies as a function of time in accordance with the modulation. Thus, the vector notation of the signal received from the remote station 11 is $f_{RF}\angle\phi+\alpha(t)$. As will be recalled from the preceding discussion of the basic circuitry of FIGURE 3, it is desired to provide the IF voltage controlled oscillators with a control voltage which will maintain the oscillator output in phase conjugate relationship with the received signal. Thus, it is desired to maintain the output of the voltage controlled oscillator 77 in accordance with the notation $$f_{IF}\angle-\phi-\alpha(t)$$

As before, the control voltage for this oscillator is provided by a closed servo loop including the lower sideband output of a double sideband modulator, the control voltage quickly approaching zero as the output of the oscillator 77 attains the desired phase conjugate relationship, the closed loop servo system being driven to its null balance. Thus, as long as the output of the voltage controlled oscillator 77 is in the desired phase conjugate relationship with the received signal, the output of the frequency converter 70 will be a signal $f_{IF}\angle 0$, which is identical to the IF reference signal applied to the terminal 76 to thereby provide zero output from the phase descriminator 75. The lower sideband output of the modulator 71 is dependent upon the two signals fed into its input, these signals being $f_{RF}\angle 0$ (from the RF oscillator 79) and $F_{IF}\angle-\phi-\alpha(t)$ (from the IF oscillator 77). The combination of these two input signals results in a lower sideband signal $(f_{RF}-f_{IF})\angle\phi+\alpha(t)$, providing the desired frequency converter output phasing. Now, as the angle $\alpha$ varies with time in accordance with the applied modulation, the servo loop control voltage applied to the IF oscillator 77 will cause the oscillator output to vary accordingly to thereby maintain the oscillator output in the desired phase conjugate relationship with the received signal.

A similar closed loop servo system is provided in the right-hand portion of the circuitry to which the signal from the ground station 12 is fed. The signal $f'_{RF}\angle\phi'$, from the ground station 12 is fed to the frequency converter 87 from the signal terminal 67 of the diplexer 65, the output of the IF oscillator 92 being maintained in phase conjugate relationship with this signal by null balancing of its servo loop, the control voltage fed to the oscillator 92 being derived by heterodyning the RF carrier received from the ground station 12 with the lower sideband output of the modulator 83. Should modulation be applied to the RF carrier from the ground station 12, the output of the IF oscillator 92 will still be maintained in the desired phase conjugate relationship; however, for proper circuit operation, only one of the two received signals can be modulated at any given time.

Under the hereinabove assumed exemplary operating conditions, wherein modulation is applied to the signal from the ground station 11, the modulation component, reversed in phase, is utilized to provide control voltage for the RF reference oscillator 93. Thus, the output of the IF oscillator 77 is fed to a discriminator 96, which detects the modulation component and produces an output voltage phased as $-\alpha(t)$ which provides the control voltage for the RF oscillator 93. As stated hereinabove, for proper circuit operation, only one of the received signals can be modulated at a given time. Under the desired exemplary conditions wherein the signal from the ground station 11 is the one modulated, it is desired to transfer this modulation intelligence to the signal transmitted by the antenna 60 to the ground station 12. Thus, the switch 97 is closed and the switch 95 is opened, in order that the modulation on the signal at the frequency $f_{RF}$ will be transferred to the signal emitted on the frequency $f'_{RF}$. In the case where it is desired to relay intelligence from the ground station 12 to the ground station 11, then the switch 95 must be closed and the switch 97 opened. Thus, it is apparent that only one of the switches 95 and 97 are closed at a given time, depending upon the direction in which the modulation intelligence is to be relayed. In practice, these switches are preferably solid state devices, such as semi-conductor diodes for example, and can be automatically actuated by output voltages from their associated discriminators or by control signals from the ground stations.

Under the exemplary operating conditions, the right-hand or primed portion of the circuitry of FIGURE 4 (that portion handling the signals received and transmitted between the module and the ground station 12) operates in the manner explained hereinabove with reference to the operation of FIGURE 3, the modulation of the RF reference oscillator 93 being obtained from the left-hand or unprimed portion of the circuitry through the discriminator 96 and the switch 97. The upper sideband output of the modulator 83, under the exemplary operating conditions, will be $(f'_{RF}+f_{IF})\angle-\phi'-2\alpha(t)$, this signal being fed through the diplexer 82 and the circulator 61, and radiated by the antenna 60 to the ground station 12. Thus, the signal relayed back to the ground station 12 will contain the modulation intelligence received from the ground station 11, while still being coherently focused on the ground station 12. Under the exemplary operating conditions, the upper sideband output of the modulator 71 will be $(f_{RF}+f_{IF})\angle-\phi-\alpha(t)$, this signal also being fed through the diplexer 82 and the circulator 61, and radiated by the antenna 60 back to the ground station 11. Thus, the desired phase conjugate relationship is obtained, with the signal transmitted to the ground station 11 being of a different frequency than that of the carrier received from that ground station. Hence, the antenna module of FIGURE 4 provides both retrodirectivity and bistatic operation.

A dispersed array of antennas may be formed by utilizing a plurality of the antenna modules of FIGURE 4, each of the modules being fed identical RF reference signals. When employing such an array on a satellite repeater, such as illustrated in FIGURE 1, bistatic operation will be provided and hence there is no need to maintain the satellite repeater in a spin-stabilized attitude, the modulation intelligence being transferred from one beam to another within the repeater unit. Such a dispersed array is schematically depicted in FIGURE 5, wherein the same reference numerals are used for those components which are identical to components in FIGURE 4. In the formation of such a dispersed array of antennas, only one each of the two RF reference oscillators (operating on the respective frequencies $f_{FR}$ and $f'_{RF}$) need be utilized, the output of each of the RF oscillators being fed to the appropriate modulator input in each of the modules through a suitable distribution means. For example, the output of the RF oscillator 79 could be fed to a power divider 100, one each of the power divider outputs being fed to the modulator 71 in the unprimed circuitry of a different module. Similarly, the output of the RF oscillator 93 could be fed to another power divider 101, one each of this power divider outputs being fed to the modulator 83 in the primed circuitry of a different module in the array. The control voltage for the "unprimed" RF reference oscillator (79) is obtained by coherently summing the outputs of the "primed" IF oscillators of each module, a coherent summing network 103 being inserted between the output of the discriminator 94 and the switch 95 in each module. Similarly, the control voltage for the primed RF reference oscillator (93) is obtained by coherently summing the outputs of each of the unprimed IF oscillators, a coherent summing network 104 being connected between the output of the discriminator 96 and the switch 97 in each module.

By coherently summing the modulation intelligence, a significant increase in signal-to-noise ratio is achieved, as will now be explained. The signals fed to the coherent summing networks include both modulation components and noise components. The modulation components presented to each of the coherent summing networks from the different antenna modules in the array are substantially in phase, while the noise components are of random phase. Since only in-phase components will be coherently summed, the outputs of the coherent summing networks consist essentially only of modulation components, thereby providing a significant improvement in signal-to-noise ratio.

The bandwidth of the bistatic array depends upon the frequency deviation resulting from the imposed modulation intelligence, this frequency deviation causing a phase error for the array. Hence, the maximum frequency deviation permissible under modulation is limited by the maximum phase error which can be tolerated. It has been found that the maximum bandwidth for the array is determinable in accordance with the following general relationship:

$$f<\Sigma(\phi/2\pi)((d/c)\sin\theta)$$

where:

$f$=maximum bandwidth
$\phi$=maximum permissible phase error
$d$=separation distance between farthest spaced antennas in the array
$c$=velocity of light
$\theta$=complement of broadside angle (broadside angle is angle of incidence of wavefront of received signal).

Thus, there has been described the evolution of a dispersed array of antenna modules providing both retrodirectivity and bistatic operation, the array being suitable for use as a microwave communications repeater for frequency or phase modulated signals. Monostatic antenna modules using RF and superheterodyne detection have also been described and are themselves useful in certain applications. Hence, although the invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed. For example, although RF circulators were illustrated for use as the antenna coupling devices 21, 41 and 61 of the embodiments of the respective FIGURES 2, 3 and 4, those skilled in the art will appreciate from the explanation of the functions of the antenna coupling devices that diplexers could be substituted for the circulators in these embodiments.

What is claimed is:

1. In an antenna module including an antenna coupled to means for the reception and radiation of radio frequency signals, a circuit comprising:

(a) IF signal generating means for generating signals of a predetermined intermediate frequency, said IF signal generating means including means responsive to an applied electrical control signal to controllably alter the phasing of signals generated by said IF signal generating means;

(b) modulator means intercoupling said antenna and said IF signal generating means for combining the output of said IF signal generating means with an RF reference signal of a predetermined radio frequency to produce upper and lower sideband outputs, one of the upper and lower sideband outputs of said modulator means being fed to said antenna for radiation thereby; and, (c) phasing control means having its input coupled to said modulator means and to said antenna for combining the other one of said upper and lower sideband outputs of said modulator means with radio frequency signals received by said antenna to produce an output signal which varies in accordance with differences in phase between the received signal and the other one of said upper and lower sideband outputs of said modulator means, the output of said phasing control means being coupled to said means for controllably altering the phasing of signals generated by said IF signal generating means to provide the electrical control signal therefor.

2. In an antenna module including an antenna coupled to means for the reception and radiation of radio frequency signals, a circuit for continuously maintaining signals radiated by said antenna in predetermined frequency and phase relationship with signals of a predetermined radio frequency received by said antenna, said circuit comprising:

(a) IF signal generating means for generating signals of a predetermined intermediate frequency, said IF signal generating means including means responsive to an applied electrical control signal to controllably alter the phasing of signals generated by said IF signal generating means;

(b) modulator means coupled to said antenna and to said IF signal generating means for combining the output of said IF signal generating means with an RF reference signal of said predetermined radio frequency to produce upper and lower sideband outputs, the upper sideband output of said modulator means being fed to said antenna for radiation thereby; and (c) phasing control means having its input coupled to said modulator means and to said antenna for combining the lower sideband output of said modulator means with signals of said predetermined radio frequency received by said antenna to produce an output signal which varies in accordance with differences in phase between the received signal and the lower sideband output of said modulator means, the output of said phasing control means being coupled to said means for controllably altering the phasing of signals generated by said IF signal generating means to provide the electrical control signal therefor.

3. In an antenna module including an antenna coupled to means for the reception and radiation of radio frequency energy, a circuit for transferring intelligence from RF signals of a first reception frequency received by said antenna from a first remote location to RF signals radiated by said antenna on a first transmission frequency to a second remote location, and for transferring intelligence from RF signals of a second reception frequency received by said antenna from said second remote location to RF signals radiated by said antenna on a second transmission frequency to said first remote location, said circuit comprising:

(a) first signal producing means coupled to said antenna for feeding RF signals of said first transmission frequency to said antenna, said RF signals of said first transmission frequency radiated by said antenna being coherently focused on said second remote location;

(b) second signal producing means coupled to said antenna for feeding RF signals of said second transmission frequency to said antenna, said RF signals of said second transmission frequency radiated by said antenna being coherently focused on said first remote location; and, (c) means intercoupling said first and second signal producing means for selectively transferring intelligence from signals of said first reception frequency received by said antenna to said signals of said second transmission frequency fed to said antenna by said second signal producing means and for selectively transferring intelligence from signals of said second reception frequency received by said antenna to said signals of said first transmission frequency fed to said antenna by said first signal producing means.

4. In an antenna module including an antenna coupled to means for the reception and radiation of radio frequency energy, a circuit for transferring intelligence from RF signals of a first reception frequency received by said antenna from a first remote location to RF signals radiated by said antenna on a first transmission frequency to a second remote location, and for transferring intelligence from RF signals of a second reception frequency received by said antenna from said second remote location to RF signals radiated by said antenna on a second transmission frequency to said first remote location, said circuit comprising:

(a) an antenna coupling device for connection to said antenna, said antenna coupling device having a signal receiving terminal and a transmitting signal terminal, said antenna coupling device directing RF signals received by said antenna selectively to said signal receiving terminal and directing RF signals impressed on said transmitting signal terminal selectively to said antenna;

(b) frequency selective RF coupling means having a common terminal and first and second signal terminals, the common terminal of said RF coupling means being interconnected with its first signal terminal selectively for signals of said first reception frequency and with its second signal terminal selectively for signals of said second reception frequency, the common terminal of said RF coupling means being coupled to the signal receiving terminal of said antenna coupling device;

(c) first IF signal generating means for generating signals of a predetermined intermediate frequency, said first IF signal generating means including means responsive to an applied electrical control signal for controllably varying the phasing of signals generated by said first IF signal generating means;

(d) first control means intercoupling the first signal terminal of said frequency selective RF coupling means with said means for controllably varying the phasing of signals generated by said first IF signal generating means for applying an electrical control signal to said last-mentioned means to controllably vary the phasing of signals generated by said first IF signal generating means to maintain the so-generated IF signals in phase conjugate relationship with signals of said first reception frequency received by said antenna, said first control means also being coupled to the output of said first IF signal generating means for deriving therefrom a signal which is maintained in phase therewith and of said second transmission frequency, said derived signal being fed to the transmitting signal terminal of said antenna coupling device;

(e) second IF signal generating means for generating signals of said predetermined intermediate frequency, said second IF signal generating means including means responsive to an applied electrical control signal for controllably varying the phasing of signals generated by said second IF signal generating means;

(f) second control means intercoupling the second signal terminal of said frequency selective RF coupling means with said means for controllably varying the phasing of signals generated by said second IF signal generating means for applying an electrical control signal to said last-mentioned means to controllably vary the phasing of signals generated by said second IF signal generating means to maintain the so-generated IF signals in phase conjugate relationship with signals of said second reception frequency received by said antenna, said second control means also being coupled to the output of said second IF signal generating means for deriving therefrom a signal which is maintained in phase therewith and of said first transmission frequency, said derived signal being fed to the transmitting signal terminal of said antenna coupling device; and, (g) means intercoupling said first and second control means for further altering the phasing of the signal of said second transmission frequency derived from the output of said first IF signal generating means in accordance with the intelligence from signals of said second reception frequency received by said antenna, and for further altering the phasing of the signal of said first transmission frequency derived from the output of said second IF signal generating means in accordance with the intelligence from signals of said first reception frequency received by said antenna.

5. In an antenna module including an antenna coupled to means for the reception and radiation of radio-frequency energy, a circuit for tranferring intelligence from RF signals of a first reception frequency received by said antenna from a first remote location to RF signals radiated by said antenna on a first transmission frequency to a second remote location, and for transferring intelligence from RF signals of a second reception frequency received by said antenna from said second remote location to RF signals radiated by said antenna on a second transmission frequency to said first remote location, said circuit comprising:

(a) an antenna coupling device for connection to said antenna, said antenna coupling device having a signal receiving terminal and a transmitting signal terminal, said antenna coupling device directing RF signals received by said antenna selectively to said signal receiving terminal and directing RF signals impressed on said transmitting signal terminal selectively to said antenna;

(b) frequency selective RF coupling means having a common terminal and first and second signal terminals, the common terminal of said RF coupling means being interconnected with its first signal terminal selectively for signals of said first reception frequency and with its second signal terminal selectively for signals of said second reception frequency, the common terminal of said RF coupling means being coupled to the signal receiving terminal of said antenna coupling device;

(c) first IF signal generating means for generating signals of a predetermined intermediate frequency, said first IF signal generating means including means responsive to an applied electrical control signal for controllably varying the phasing of signals generated by said first IF signal generating means;

(d) first RF signal generating means for generating signals of said first reception frequency, said first RF signal generating means including means responsive to an applied electrical control signal for controllably varying the phasing of signals generated by said first RF signal generating means;

(e) first modulator means for combining the signals generated by said first IF signal generating means and by said first RF signal generating means to produce upper and lower sideband outputs, the upper sideband output of said first modulator means being coupled to the transmitting signal terminal of said antenna coupling device;

(f) first phasing control means having its input coupled to the lower sideband output of said first modulator means and to the first signal terminal of said RF coupling means to produce an output signal which varies in accordance with differences in phase between received signals of said first reception frequency and the lower sideband output of said first modulator means, the output of said first phasing control means being coupled to said means for controllably varying the phasing of signals generated by said first IF signal generating means to provide the electrical control signal therefor;

(g) second IF signal generating means for generating signals of said predetermined intermediate frequency, said second IF signal generating means including means responsive to an applied electrical control signal for controllably varying the phasing of signals generated by said second IF signal generating means;

(h) second RF generating means for generating signals of said second reception frequency, said second RF signal generating means including means responsive to an applied electrical control signal for controllably varying the phasing of signals generated by said second RF signal generating means;

(i) second modulator means for combining the signals generated by said second IF signal generating means with the signals generated by said second RF signal generating means to produce upper and lower sideband outputs, the upper sideband output of said second modulator means being coupled to the transmitting signal terminal of said antenna coupling device;

(j) second phasing control means having its input coupled to the lower sideband output of said second modulator means and to the second signal terminal of said RF coupling means to produce an output signal which varies in accordance with differences in phase between received signals of said second reception frequency and the lower sideband output of said second modulator means, the output of said second phasing control means being coupled to said means for controllably varying the phasing of signals generated by said second IF signal generating means to provide the electrical control signal therefor;

(k) first phase detection means having its input coupled to the output of said first IF signal generating means, the output of said first phase detection means being coupled to said means for controllably varying the phasing of signals generated by said second RF signal generating means to provide the electrical control signal therefor; and, (l) second phase detection means having its input coupled to the output of said second IF signal generating means, the output of said second phase detection means being coupled to said means for controllably varying the phasing of signals generated by said first RF signal generating means to provide the electrical control signal therefor.

6. In a dispersed array of antennas in which each antenna is coupled to a separate unit for the reception and radiation of radio frequency energy, a communications repeater system for transferring intelligence from RF signals of a first reception frequency received by each of the antennas in said array from a first remote location to RF signals radiated by each of the antennas in said array on a first transmission frequency and beamed at a second remote location, and for transferring intelligence from RF signals of a second reception frequency received by each of the antennas in said array from said second remote location to RF signals radiated by each of the antennas in said array on a second transmission frequency and beamed at said first remote location, said system comprising, in combination:

(a) first signal producing means for each of said units, each of said first signal producing means being coupled to the antenna associated with that unit for feeding RF signals of said first transmission frequency to that antenna, the RF signals of said first transmission frequency radiated by each antenna being coherently focused on said second remote location;

(b) second signal producing means for each of said units, each of said second signal producing means being coupled to the antenna associated with that unit for feeding RF signals of said second transmission frequency to that antenna, said RF signals of said second transmission frequency radiated by each antenna being coherently focused on said first remote location;

(c) means for coherently summing the intelligence from the signals of said first reception frequency received by each antenna in the array and transferring such coherently summed intelligence to the signals of said second transmission frequency fed to each of the antennas in said array; and, (d) means for coherently summing the intelligence from the signals of said second reception frequency rceived by each antenna in the array and transferring such coherently summed intelligence to the signals of said first transmission frequency fed to each of the antennas in said array.

7. In a dispersed array of antennas in which each antenna is coupled to a separate unit for the reception and radiation of radio frequency energy, a communications repeater system for transferring intelligence from RF signals of a first reception frequency received by each of the antennas in said array from a first remote location to RF signals radiated by each of the antennas in said array on a first transmission frequency and beamed at a second remote location, and for transferring intelligence from RF signals of a second reception frequency received by each of the antennas in said array from said second remote location to RF signals radiated by each of the antennas in said array on a second transmission frequency and beamed at said first remote location, said system comprising, in combination:

(a) an antenna coupling device for each of said units, each of said antenna coupling devices having a signal receiving terminal and a transmitting signal terminal, each of said antenna coupling devices being adapted for directing RF signals received by the antenna associated with that unit selectively to said signal receiving terminal and for directing RF signals impressed on said transmitting signal terminal selectively to that antenna;

(b) frequency selective RF coupling means for each of said units, each of said RF coupling means having a common terminal and first and second signal terminals, the common terminal of each of said RF coupling means being interconnected with its first signal terminal selectively for signals of said first reception frequency and with its second signal terminal selectively for signals of said second reception frequency, the common terminal of each of said RF coupling means being coupled to the signal receiving terminal of the antenna coupling device of that unit;

(c) first IF signal generating means for each of said units, each of said first IF signal generating means being adapted for generating signals of a predetermined intermediate frequency, each of said first IF signal generating means including means responsive to an applied electrical control signal for controllably varying the phasing of signals generated by said first IF signals generating means;

(d) first control means for each of said units, each of said first control means intercoupling the first signal terminal of the frequency selective RF coupling means of that unit with said means for controllably varying the phasing of signals generated by the first IF signal generating means of that unit for applying an electrical control signal to said last-mentioned means to controllably vary the phasing of signals generated by said first IF signal generating means to maintain the so-generated IF signals in phase conjugate relationship with signals of said first reception frequency received by the antenna associated with that unit, said first control means also being coupled to the output of said first IF signal generating means of that unit for deriving therefrom a signal which is maintained in phase therewith and of said second transmission frequency, said derived signal being fed to the transmitting signal terminal of the antenna coupling device of that unit;

(e) second IF signal generating means for each of said units, each of said second IF signal generating means being adapted for generating signals of said predetermined intermediate frequency, each of said second IF signal generating means including means responsive to an applied electrical control signal for controllably varying the phasing of signals generated by said second IF signal generating means;

(f) second control means for each of said units, each of said second control means intercoupling the second signal terminal of the frequency selective RF coupling means of that unit with said means for controllably varying the phasing of signals generated by the second IF signal generating means of that unit for applying an electrical control signal to said last mentioned means to controllably vary the phasing of signals generated by said second IF signal generating means to maintain the so-generated IF signals in phase conjugate relationship with signals of said second reception frequency received by the antenna associated with that unit, each of said second control means also being coupled to the output of the second IF signal generating means of that unit for deriving therefrom a signal which is maintained in phase therewith and of said first transmission frequency, said derived signal being fed to the transmitting signal terminal of the antenna coupling device of that unit;

(g) first means intercoupling the first and second control means of all of said units for coherently summing the intelligence from the signals of said first reception frequency received by each antenna in the array and transferring such coherently summed intelligence to the signal of said second transmission frequency derived from the output of the first IF signal generating means of each unit; and, (h) second means intercoupling the first and second control means of all of said units for coherently summing the intelligence from the signals of said second reception frequency received by each antenna in the array and transferring such coherently summed intelligence to the signal of said first transmission frequency derived from the output of said second IF signal generating means of each unit.

8. In a dispersed array of antennas in which each antenna is coupled to a separate unit for the reception and radiation of radio frequency energy, a communications repeater system for transferring intelligence from RF signals of a first reception frequency received by each of the antennas in said array from a first remote location to RF signals radiated by each of the antennas in said array on a first transmission frequency and beamed at a second remote location, and for transferring intelligence from RF signals of a second reception frequency received by each of the antennas in said array from said second remote location to RF signals radiated by each of the antennas in said array on a second transmission frequency and beamed at said first remote location, said system comprising, in combination:

(a) an antenna coupling device for each of said units, each of said antenna coupling devices having a signal receiving terminal and a transmitting signal terminal, each of said antenna coupling devices being adapted for directing RF signals received by the antenna associated with that unit selectively to said signal receiving terminal and for directing RF signals impressed on said transmitting signal terminal selectively to that antenna;

(b) frequency selective RF coupling means for each of said units, each of said RF coupling means having a common terminal and first and second signal terminals, the common terminal of each of said RF coupling means being interconnected with its first signal terminal selectively for signals of said first reception frequency and with its second signal terminal selectively for signals of said second reception frequency, the common terminal of each of said RF coupling means being coupled to the signal receiving terminal of the antenna coupling device of that unit;

(c) first IF signal generating means for each of said units, each of said first IF signal generating means being adapted for generating signals of a predetermined intermediate frequency, each of said first IF signal generating means including means responsive to an applied electrical control signal for controllably varying the phasing of signals generated by said first IF signal generating means;

(d) first RF signal generating means for generating signals of said first reception frequency, said first RF signal generating means including means responsive to an applied electrical control signal for controllably varying the phasing of signals generated by said first RF signal generating means;

(e) first modulator means for each of said units for combining the signals generated by the first IF generating means of that unit with the signals generated by said first RF signal generating means to thereby produce upper and lower sideband outputs, the upper sideband output of each of said first modulator means being coupled to the transmitting signal terminal of the antenna coupling device of that unit;

(f) first phasing control means for each of said units, each of said first phasing control means having its input coupled to the lower sideband output of the first modulator means of that unit and to the first signal terminal of the RF coupling means of that unit to produce an output signal which varies in accordance with differences in phase between received signals of said first reception frequency and the lower sideband output of said first modulator means, the output of each of said first phasing control means being coupled to said means for controllably varying the phasing of signals generated by the first IF signal generating means of that unit to provide the electrical control signal therefor;

(g) second IF signal generating means for each of said units, each of said second IF signal generating means being adapted for generating signals of said predetermined intermediate frequency, each of said second IF signal generating means including means responsive to an applied electrical control signal for controllably varying the phasing of signals generated by said second IF signal generating means;

(h) second RF generating means for generating signals of said second reception radio frequency, said second RF signal generating means including means responsive to an applied electrical control signal for controllably varying the phasing of signals generated by said second RF signal generating means;

(i) second modulator means for each of said units for combining the signals generated by the second IF signal generating means of that unit with the signals generated by said second RF signal generating means to thereby produce upper and lower sideband outputs, the upper sideband output of each of said second modulator means being coupled to the transmitting signal terminal of the antenna coupling device of that unit;

(j) second phasing control means for each of said units, each of said second phasing control means having its input coupled to the lower sideband output of the second modulator means of that unit and to the second signal terminal of the RF coupling means of that unit to produce an output signal which varies in accordance with differences in phase between received signals of said second reception frequency and the lower sideband output of said second modulator means, the output of each of said second phasing control means being coupled to said means for controllably varying the phasing of signals generated by the second IF signal generating means of that unit to provide the electrical control signal therefor;

(k) first detection means for each of said units, the input of each of said first phase detection means being coupled to the output of the first IF signal generating means of that unit to produce an output voltage which varies in accordance with changes in the phase of signals generated by said first IF signal generating means;

(l) second phase detection means for each of said units, each of said second phase detection means being coupled to the output of the second IF signal generating means of that unit to produce an output voltage which varies in accordance with changes in the phase of signals generated by said second IF signal generating means;

(m) means for coherently summing the output of all of said first phase detection means and applying the resulting voltage to said means for controllably varying the phasing of signals generated by said second RF signal generating means to provide the electrical control signal therefor; and, (n) means for coherently summing the output of all of said second phase detection means and applying the resulting voltage to said means for controllably varying the phasing of signals generated by said first RF signal generating means to provide electrical control signal therefor.

References Cited by the Examiner

UNITED STATES PATENTS

| | | |
|---|---|---|
| 3,166,749 | 1/1965 | Schelleng et al. |
| 3,174,150 | 3/1965 | Sferrazza et al. |
| 3,175,216 | 3/1965 | Enloe. |

RODNEY D. BENNETT, *Primary Examiner.*

R. E. BERGER, *Assistant Examiner.*